United States Patent [19]

Kishi et al.

[11] Patent Number: 5,066,847
[45] Date of Patent: Nov. 19, 1991

[54] AUTOMATIC WELDING MACHINE PATH CORRECTION METHOD

[75] Inventors: Hajimu Kishi, Hino; Tohru Mizuno, Tama; Yuichi Kanda, Kitakata, all of Japan

[73] Assignee: Fanuc Ltd., Yamanashi, Japan

[21] Appl. No.: 269,742

[22] PCT Filed: Apr. 22, 1988

[86] PCT No.: PCT/JP88/00396

§ 371 Date: Oct. 28, 1988

§ 102(e) Date: Oct. 28, 1988

[87] PCT Pub. No.: WO88/08350

PCT Pub. Date: Nov. 3, 1988

[30] Foreign Application Priority Data

Apr. 23, 1987 [JP] Japan .................. 62-100912

[51] Int. Cl.$^5$ ............................................. B23K 9/127
[52] U.S. Cl. .......................... 219/124.34; 219/125.12
[58] Field of Search ................. 219/125.12, 124.34, 219/124.22

[56] References Cited

U.S. PATENT DOCUMENTS

| | | | |
|---|---|---|---|
| 4,417,126 | 11/1983 | Kasahara et al. | 219/125.12 |
| 4,485,291 | 11/1984 | Nomura et al. | 219/125.12 |
| 4,543,539 | 9/1985 | Seki et al. | 330/297 |
| 4,587,398 | 5/1986 | Sarugaku et al. | 219/125.12 |
| 4,654,568 | 3/1987 | Mansmann | 318/293 |

FOREIGN PATENT DOCUMENTS 0139137 5/1985 European Pat. Off. .
59-156577 9/1984 Japan .

*Primary Examiner*—Clifford C. Shaw
*Attorney, Agent, or Firm*—Staas & Halsey

[57] ABSTRACT

According to a path correction method in an automatic welding machine in accordance with the invention, the torch TC of a welding machine is grasped by a robot and welding is performed while the welding torch is weaved to the left and right of a welding line. At such time, an integrated value of welding current of the torch weaved with respect to a given welding line is computed every half cycle, the correction direction is decided, the amount of correction is decided by performing a computation, which is based on the integrated value, in dependence upon the correction direction decided, and the weaving path of the torch is corrected by multiplying the decided amount of correction by a predetermined coefficient.

1 Claim, 3 Drawing Sheets

AUTOMATIC WELDING MACHINE PATH CORRECTION METHOD

BACKGROUND OF THE INVENTION

1. Description of the Related Art

This invention relates to an automatic welding machine path correction method for performing welding while weaving a welding torch left and right with respect to a welding line.

2. Background Art

An automatic welding machine performs welding by impressing a voltage across a wire and a workpiece to produce an arc at the tip of the wire, and moving the wire tip along a welding path while the wire is successively paid out in small increments.

FIG. 6 is a schematic view of such a welding machine. In the Figure, WR denotes the wire, which is paid out in small increments in the direction of the arrow by feed rollers FR so that its tip protrudes from the end of a torch TC via an energizing tip ET, with the amount by which the wire is fed being limited in such a manner that the tip comes to occupy a position spaced a predetermined distance from the surface of the workpiece WK at all times. A welding power supply PS, which is for impressing the voltage across the wire WR and the workpiece WK, generates a continuous high voltage at a predetermined period. The plus side of the welding power supply PS is applied to the wire WR through the guide member GB, and the minus side is connected to the workpiece WK. In the torch TC, a shielding gas is supplied by a gas supply source, not shown. By being jetted toward the portion being welded, the shielding gas makes it possible to prevent oxidation of the welded portion of the workpiece WK when welding is carried out.

The high voltage is generated continuously by the welding power supply PS while the shielding gas is fed from the gas supply unit, not shown, and the wire WR is paid out in small increments in the welding machine having the above construction. As a result, an arc is produced at the tip of the wire and both the wire and the portion being welded are melted to weld the fused portions of the workpiece together. It has recently become possible to perform such a welding operation automatically by robot. Specifically, the torch TC of the welding machine is grasped by a robot, which is caused to move the torch (the tip of the wire) along a welding path to weld the workpiece.

When weaving is performed to the left and right of a cutting line CT, as shown in FIG. 4, the robot control unit calculates the extreme points to the left and right from starting and end points, which have been taught, as well as amplitude and frequency. Movement of the torch TC is controlled based on the results of calculation. However, in cases where there are differences in the machined precision of the workpiece or where there is a shift in the attached position, welding cannot be performed accurately at the predetermined location of the workpiece WK even when the robot is controlled based on the taught points to move the torch TC.

Accordingly, as shown in FIG. 5, the conventional practice is to monitor the value of the integral of the welding current and effect a path correction upon comparing the difference between an integrated value prevailing at a leftward swing and an integrated value prevailing at a rightward swing in one cycle of weaving, which corresponds to $P_a$ through $P_b$ in FIG. 4, with a stipulated value, and comparing the integrated value with a reference value when the aforesaid difference exceeds the stipulated value.

With this conventional method of correcting the path based on the integrated value of the welding current, the amount of correction is decided depending on how the stipulated value is chosen. Consequently, in order to actually obtain an optimum amount of correction, it is necessary to perform trials repeatedly upon changing the stipulated value in various ways. That is, when the amount of correction is too large, welding deviates from the welding path and the actual welding line meanders. Conversely, when the amount of correction is too small, welding cannot follow up changes in the shape of the workpiece.

SUMMARY OF THE INVENTION

The present invention has been devised to solve the foregoing problem and its object is to provide an automatic welding machine path correction method which improves response at the time of sensing based on arc current to make possible a smooth correction in the weaving path of a torch.

According to the present invention, there is provided a path correction method in an automatic welding machine which performs welding while weaving a welding torch to the left and right of a welding line, which method is characterized by having a step of computing, every half cycle, an integrated value of welding current of the torch weaved with respect to a given welding line, a step of deciding a correction direction, a step of deciding an amount of correction by performing a computation, which is based on the integrated value, in dependence upon the correction direction, and a step of correcting a weaving path of the torch by multiplying the decided amount of correction by a predetermined coefficient.

Thus, the automatic welding machine path correction method of the invention is adapted to correct the weaving path of the torch by correcting the amount of weaving of the welding torch in half-cycle units, and multiplying the amount of correction, which is decided by a relative amount of change in the integrated value or an absolute amount of change with respect to a reference value, by a predetermined coefficient. As a result, (1) response is improved owing to the half-cycle correction of welding current, (2) a smooth correction overall is performed since the amount of correction is small when the change in the integrated value is small and large when the change is large, and (3) a wide setting for the amount of correction can be provided to facilitate the setting of the coefficients $\Delta 1$, $\Delta 2$.

DETAILED DESCRIPTION OF THE PREFERRED EMBODIMENT

An embodiment of the present invention will now be described in detail with reference to the drawings.

Figure 1:
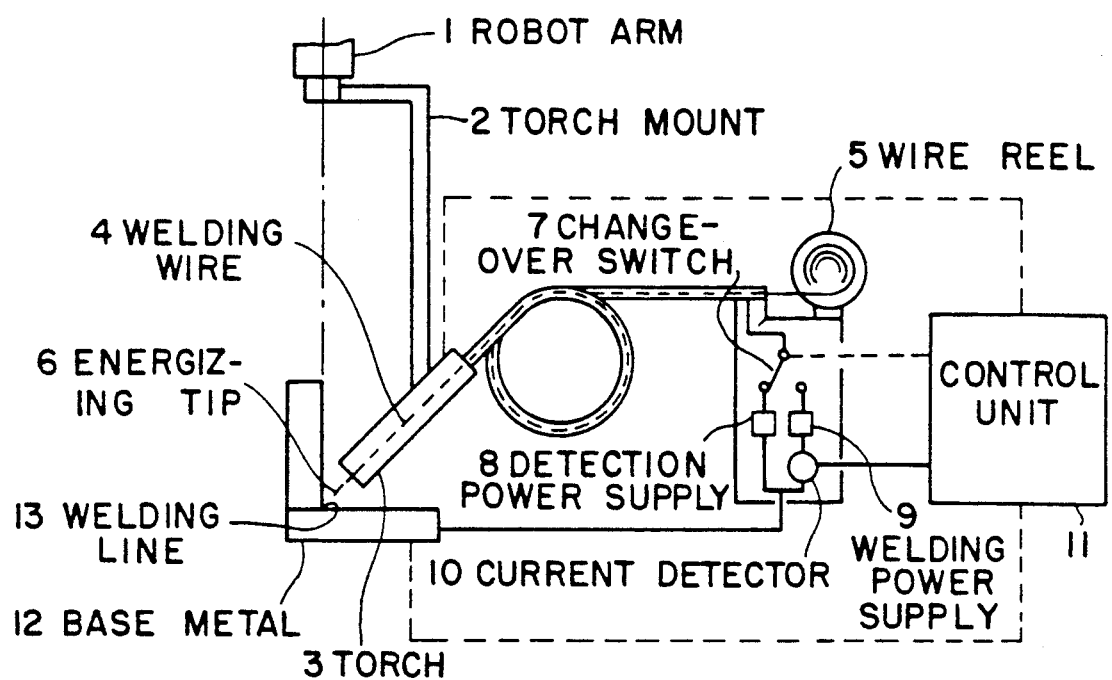
FIG. 1 is a schematic structural view illustrating an example of an welding machine to which the present invention is applied, FIGS. 2(a) through (c) and FIGS. 3(a), (b) are views for describing path correction according to the present invention.

FIG. 1 is a schematic structural view illustrating an example of an automatic welding machine to which the present invention is applied.

In FIG. 1, a torch 3 supported on a torch mount 2 is secured to a robot arm 1. A welding wire 4 is arranged in the torch 3 and is paid out from a wire reel 5. The length of the projecting welding wire is adjusted with respect to a welding line 13 of a base metal. An energizing tip 6, a changeover switch 7, a detection power supply 8, a welding power supply 9 and a current detector 10 are controlled by a control unit 11.

Prior to welding, the changeover switch 7 is switched to the detection power supply side, a short-circuit current produced when the tip of the wire contacts the workpiece is detected by the current detector 10, and the position of the workpiece is computed from the position of the torch at this time.

When welding starts, the changeover switch 7 is switched to the welding power supply side 9 and the weaving path of the torch is corrected by detecting the welding current, as will be described next.

Figure 2A:
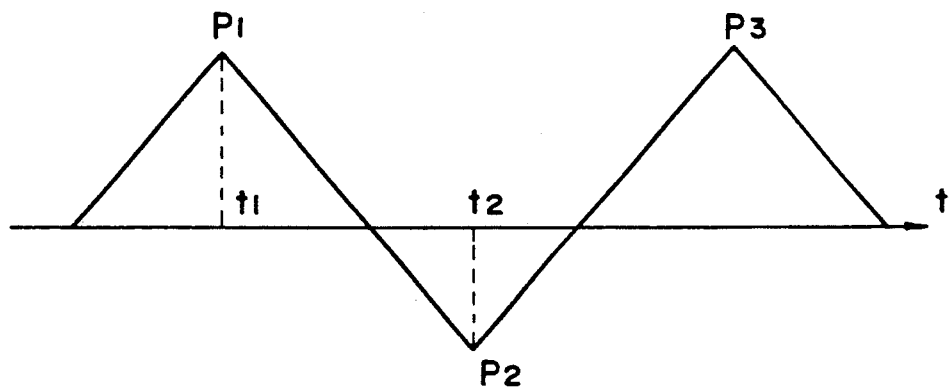
Figure 2B:
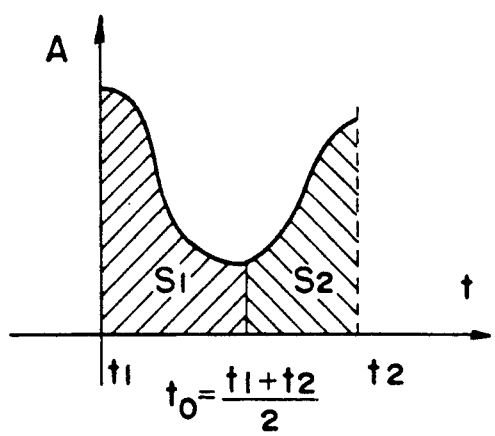

FIGS. 2(a), (b) and (c) are views for describing an embodiment of the invention. In accordance with the invention, path correction is performed in the half cycle between $P_1$ and $P_2$ in FIG. 2(a), and integrated values obtained in time $t_1 \sim t_2$ during which the welding current A in the half cycle $P_1$-$P_2$ is sampled are compared at a time $[(t_1+t_2)/2]$, as shown in FIG. 2(b). In FIG. 2(b), $t_0=[(t_1+t_2)/2]$ is set, an integrated value $S_1$ in the interval $t_1 \sim t_0$ is compared with an integrated value $S_2$ in the interval $t_0 \sim t_2$, and a correction is applied to the smaller of these integrated values.

The correction amount $T_1$ at this time is $$T_1 = |(S_2/S_1) - 1| \times \Delta 1 \qquad (1)$$

where $\Delta 1$ represents a coefficient.

Figure 2C:
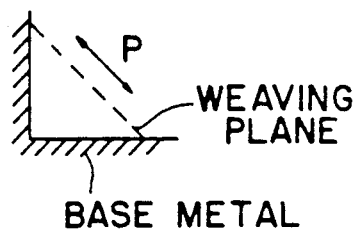

FIG. 2(c) is an explanatory view illustrating the direction of a correction. The path correction is carried out in the direction of an arrow p with respect to the plane of weaving, as shown.

Figure 3A:
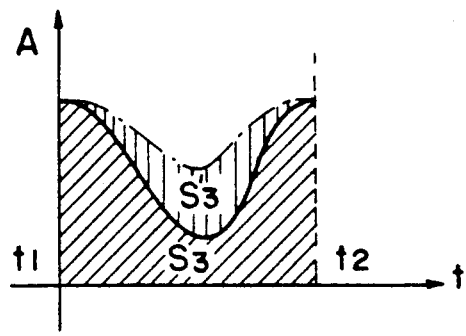

FIGS. 3(a), (b) are views for describing an example in which a path correction is performed up and down with respect to the plane of weaving.

As shown in FIG. 3(a), a reference value $S_3$ of an integrated value of the half cycle in the sampling time interval $t_1 \sim t_2$ is preset, and an integrated value $S_4 = S_3 + S_3'$ at the time of actual welding is found. Next, a correction amount T2 is computed as $$T_2 = |(S_4/S_3) - 1| \times \Delta 2 \qquad (2)$$

where $\Delta 2$ represents a coefficient.

Figure 3B:
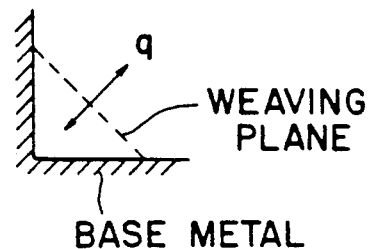
Figure 4:
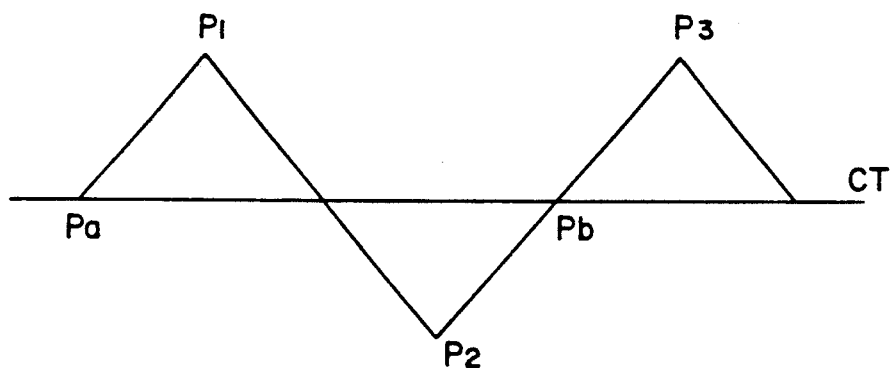
FIGS. 4 and 5 are views for describing an example of a conventional correction method.
Figure 5:
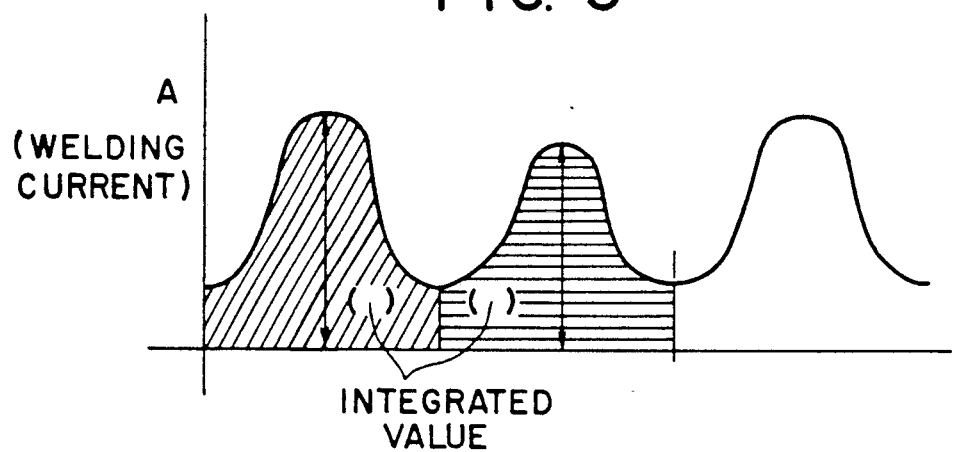
Figure 6:
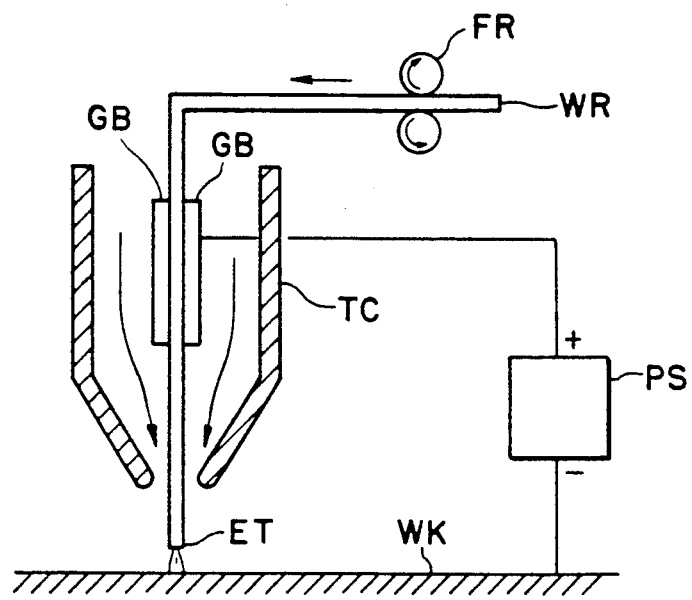
FIG. 6 is a schematic structural view of an arc welding machine

The direction of the correction in this case is a direction q, namely up and down respect to the weaving plane, as shown in FIG. 3(b).

Path correction thus described with reference to FIGS. 2(a)-(c) and FIGS. 3(a), (b) features excellent response to make possible a smooth correction.

Though an embodiment of the present invention has been described, the invention is not limited thereto and can be modified in a variety of ways without departing from the scope of the claims.

The automatic welding machine path correction method of the present invention makes it possible to improve response with regard to an amount of correction when the torch TC of a welding machine is grasped by a robot to correct the amount of weaving.

We claim:

1. A path correction method in an automatic welding machine in which a torch of a welding machine is grasped by a robot and welding is performed while the welding torch is weaved to the left and right of a welding line, which method comprises the steps of:

computing, every half cycle, an integrated value of welding current of the torch weaved with respect to a given welding line;

deciding a correction direction;

deciding an amount of correction by performing a computation, which is based on said integrated value, in dependence upon the correction direction and correcting a weaving path of said torch every half cycle by multiplying the decided amount of correction by a predetermined coefficient;

wherein welding is performed while the welding torch is weaved in a weaving plane to the left and right of a welding line, and method includes storing a reference value of the integrated value of said half cycle of welding current determining an actual integrated value of said half cycle, comparing said reference value to said actual integrated value, and determining a correction amount in a direction which will vary a distance between the weaving plane and a workpiece in dependence upon a difference in the actual integrated value with respect to said reference value.

* * * * *